(12) United States Patent
Bordignon

(10) Patent No.: US 7,394,006 B2
(45) Date of Patent: Jul. 1, 2008

(54) SUPPORTING ELEMENT FOR STRING MUSICAL INSTRUMENTS

(75) Inventor: Riccardo Bordignon, Cassola (IT)

(73) Assignee: Technoplast S.r.l., Romano (IT)

( * ) Notice: Subject to any disclaimer, the term of this patent is extended or adjusted under 35 U.S.C. 154(b) by 20 days.

(21) Appl. No.: 10/589,139

(22) PCT Filed: Feb. 18, 2004

(86) PCT No.: PCT/IT2004/000066

§ 371 (c)(1),
(2), (4) Date: Aug. 10, 2006

(87) PCT Pub. No.: WO2005/078700

PCT Pub. Date: Aug. 25, 2005

(65) Prior Publication Data

US 2007/0068362 A1    Mar. 29, 2007

(51) Int. Cl.
*G10D 3/00* (2006.01)
(52) U.S. Cl. .......................... 84/327; 248/443
(58) Field of Classification Search ................ 84/327
See application file for complete search history.

(56) References Cited

U.S. PATENT DOCUMENTS

| 633,488 | A | * | 9/1899 | Reed | 84/421 |
| 672,444 | A | * | 4/1901 | Haile | 84/327 |
| 1,762,645 | A | * | 6/1930 | John | 84/170 |
| 2,510,799 | A | * | 6/1950 | Carley | 84/327 |
| 2,547,924 | A | * | 4/1951 | Citro | 84/327 |
| 4,037,815 | A | * | 7/1977 | DeLano | 248/542 |
| 4,159,092 | A | | 6/1979 | DeLano | |
| 4,742,751 | A | * | 5/1988 | Cherry | 84/327 |
| 4,943,021 | A | * | 7/1990 | Cien et al. | 248/167 |
| 5,029,796 | A | * | 7/1991 | Schoenig | 248/443 |
| 5,202,527 | A | * | 4/1993 | Gracie | 84/327 |
| 5,375,497 | A | * | 12/1994 | Pirchio et al. | 84/327 |
| D360,427 | S | * | 7/1995 | Gracie | D17/20 |
| 5,664,756 | A | * | 9/1997 | Liao | 248/443 |
| 5,889,222 | A | * | 3/1999 | Burgess | 84/453 |
| 5,957,417 | A | * | 9/1999 | Yu | 248/166 |
| 5,986,193 | A | * | 11/1999 | Garrison | 84/327 |
| 6,005,175 | A | * | 12/1999 | Johnson | 84/327 |
| 6,005,176 | A | * | 12/1999 | Yu | 84/327 |
| 6,036,159 | A | * | 3/2000 | Yu | 248/443 |
| 6,209,829 | B1 | * | 4/2001 | Yu | 248/122.1 |
| 6,281,417 | B1 | * | 8/2001 | Ladao | 84/327 |
| 6,323,406 | B1 | | 11/2001 | Park | |

(Continued)

FOREIGN PATENT DOCUMENTS

DE    10016746 A    10/2001
DE    20219743 U    3/2003

*Primary Examiner*—Lincoln Donovan
*Assistant Examiner*—Robert W Horn
(74) *Attorney, Agent, or Firm*—IP Strategies

(57) ABSTRACT

A bearing element for stringed musical instruments comprising a mainly vertically arranged frame, placed on a bearing surface provided with support means which defines a housing able to receive the body of the instrument. Each of said support means comprises a couple of mutually opposed jaws, slidingly coupled to the support means and joined together through regulation means able to modify in a continuous way the distance between the jaws, which comprise a shaped body defining a concave surface bounding on one side said housing.

24 Claims, 7 Drawing Sheets

U.S. PATENT DOCUMENTS

| | | | |
|---|---|---|---|
| 6,693,234 B2 * | 2/2004 | Smith | 84/327 |
| 6,835,883 B2 * | 12/2004 | Stevens | 84/453 |
| 6,881,884 B2 * | 4/2005 | Hsieh | 84/327 |
| 6,982,373 B1 * | 1/2006 | Yu | 84/327 |
| 7,074,993 B1 * | 7/2006 | Hsieh | 84/327 |
| D538,554 S * | 3/2007 | Tai | D6/466 |
| 2007/0068362 A1 * | 3/2007 | Bordignon | 84/327 |
| 2008/0028912 A1 * | 2/2008 | Sawhney | 84/327 |

* cited by examiner

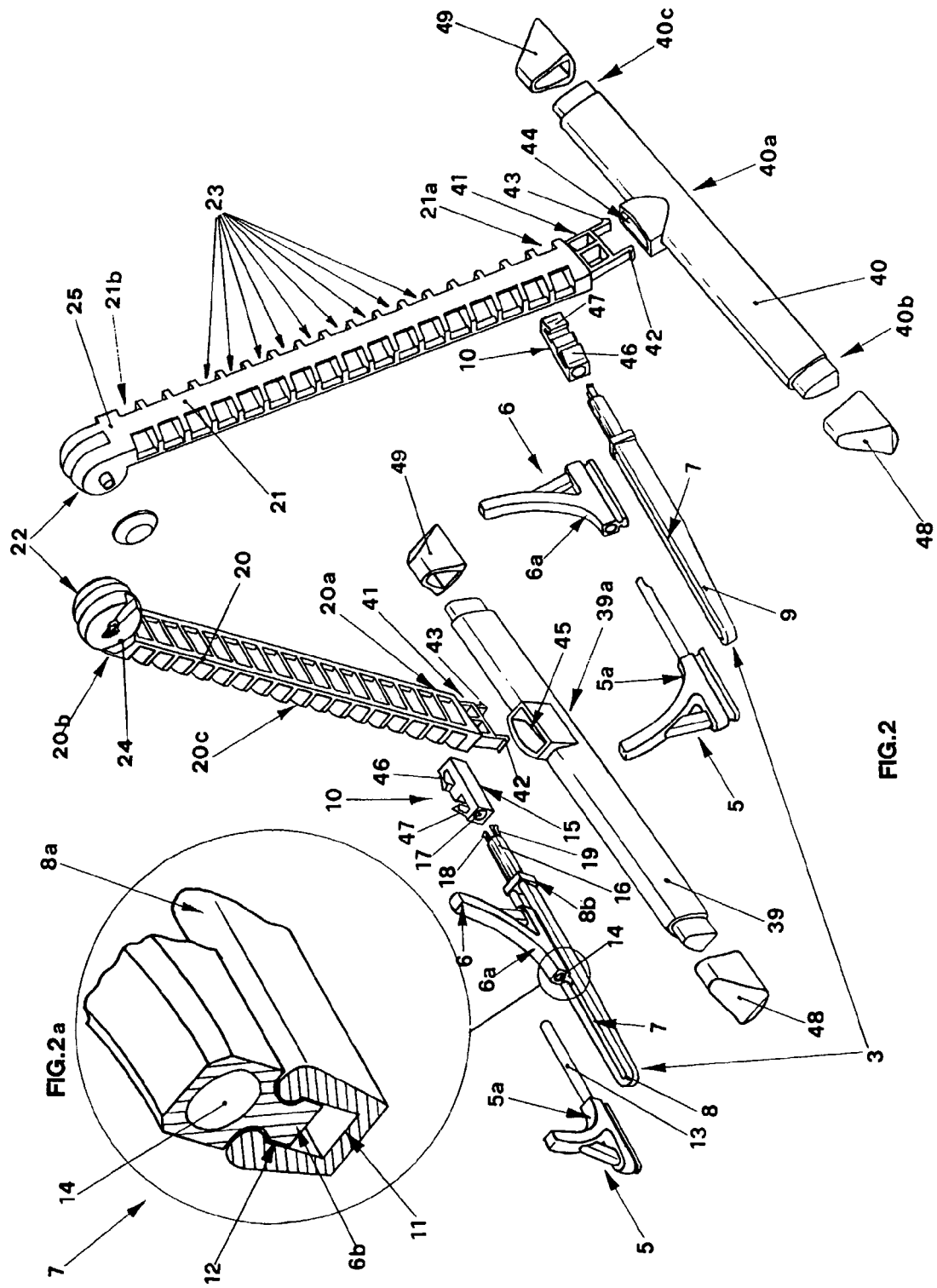

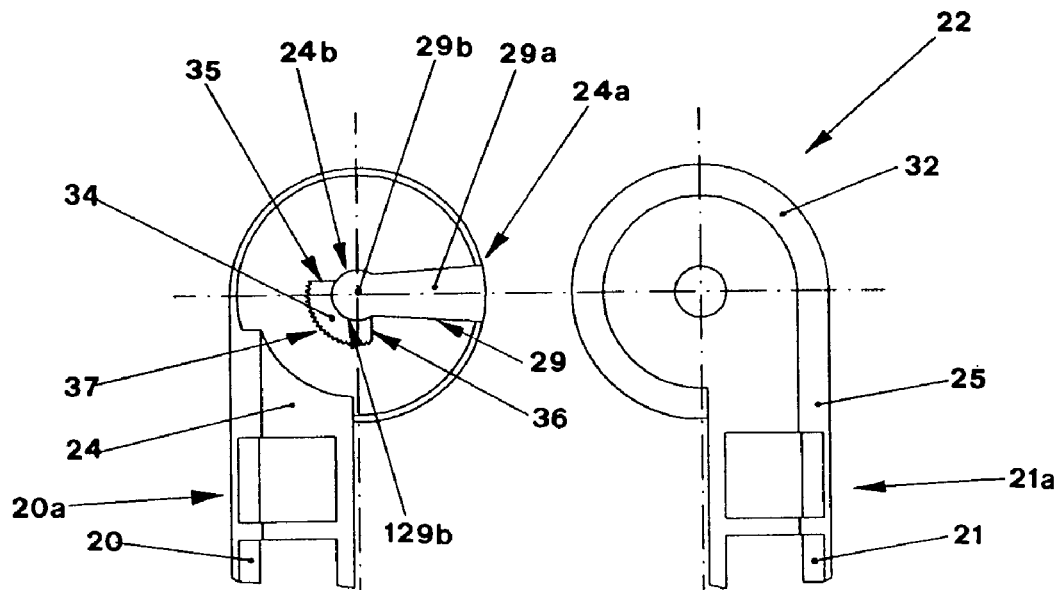
FIG. 5
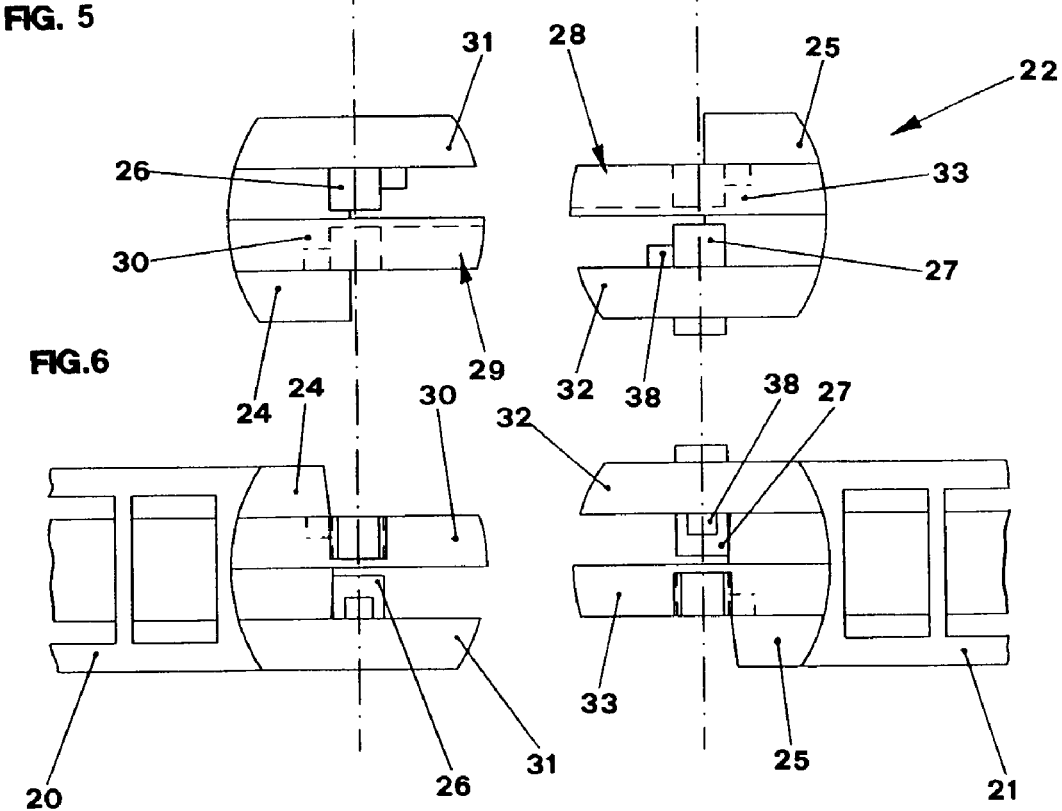
FIG. 6
FIG. 7

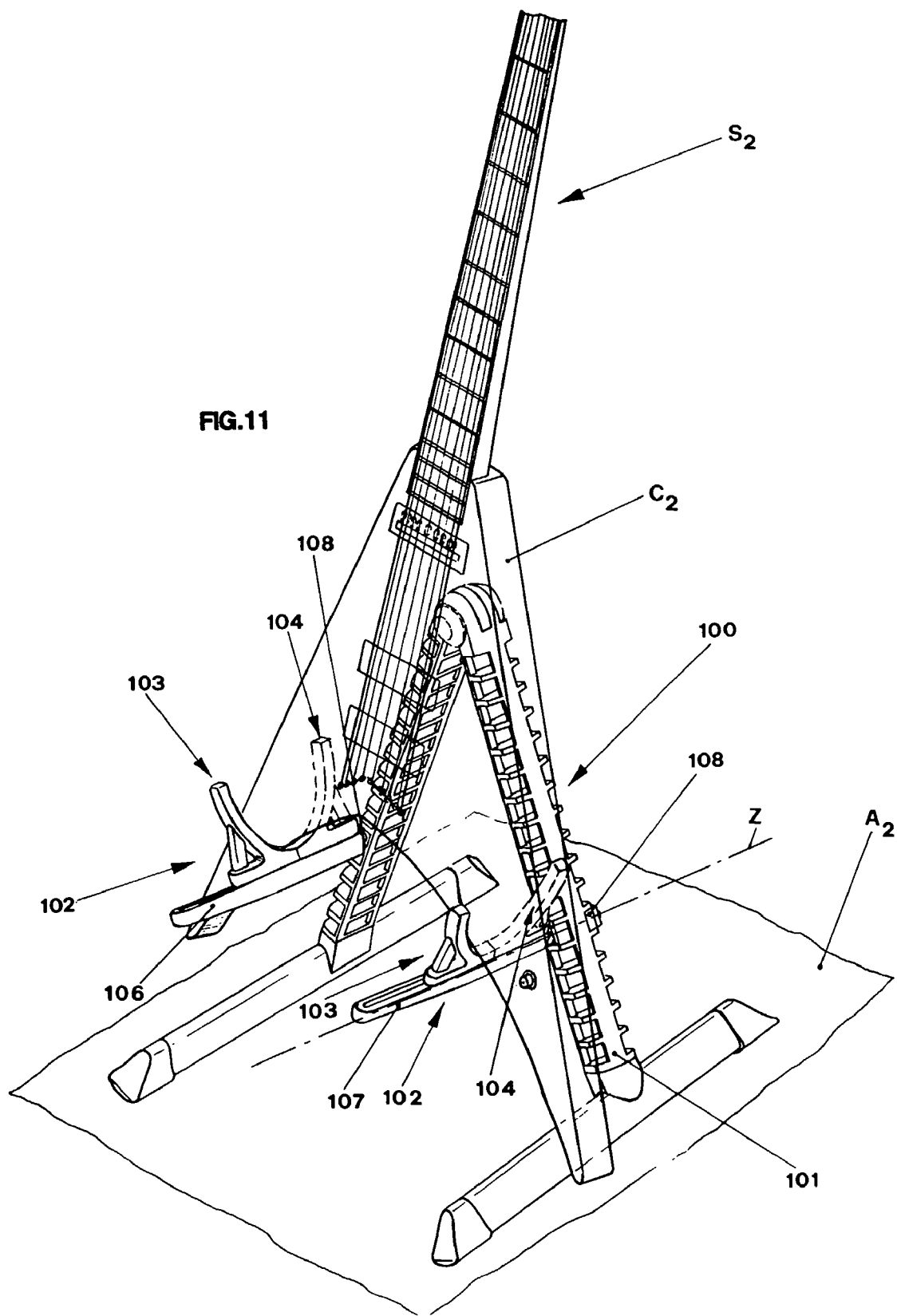

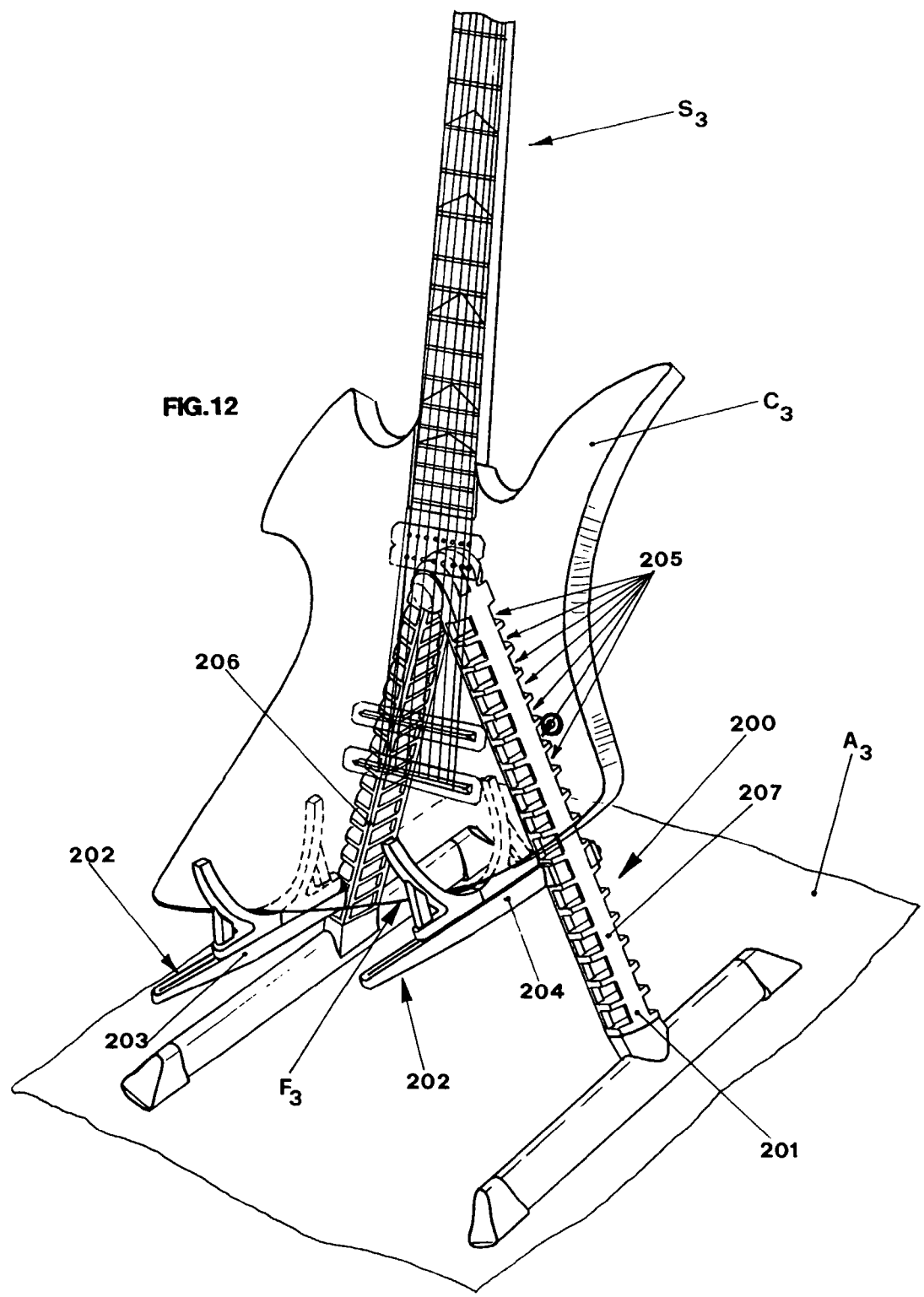

SUPPORTING ELEMENT FOR STRING MUSICAL INSTRUMENTS

BACKGROUND OF THE INVENTION

The present invention is about a bearing element for stringed musical instruments, in particular electric or acoustic guitars, violins and the like, provided with a body having any plan profile.

It is known that the components of a musical band or the persons keen on playing stringed musical instruments use a bearing element to put in correct and appropriate way the instruments.

The bearing element is generally placed on the stand where the musical band, having more stringed musical elements, is performing during a concert, or in a common room of a house or a building.

The bearing elements for stringed musical elements now available on the market are mostly made of metallic material, but there are also some of them completely made of plastic material.

Each of them is provided by a frame which, in use configuration, is mostly spread out in vertical direction.

Its arrangement on the bearing surface causes its substantially similarity to an isosceles triangle shape.

The frame comprises two longitudinal bars connected one to another at one of their ends by articulation means which allow the mutual opening or closing of the longitudinal bars according to the use requirements.

Moreover, the frame comprises support means which, for constructive conformation, allow to house the body of the stringed musical instrument so that it does not slide on the ground.

The support means essentially comprise a couple of arms projecting from the same side of each longitudinal bar of the frame.

According to the embodiments, the bearing element further comprises regulation means coupled only to the arms, or either to the arms or the frame, used to correctly place guitars, or similar musical instruments with bodies of different shape, on the bearing element.

A first adjustment is provided by the mutual opening of the longitudinal bars for placing stringed musical instruments having bodies of different size.

Another adjustment is provided by the arms, which can be coupled with the frame in several points, so to be placed at different distances form the bearing surface.

In fact, according to some well known embodiments, each of the longitudinal bars of the frame is provided, across the whole or a part of its length, with a plurality of through holes in which the end of the arm is inserted.

Said arm is fixedly secured with the frame by fastening means of known type, such as screws that can be handled by a user through a knob.

In this way, the user can place on the bearing element stringed musical elements with irregularly shaped bodies too, like electric guitars used by musical bands playing the so called "heavy metal" genre.

The user inserts one of the arms inside one of the through holes of the respective longitudinal bar, placing said arm at a predefined distance from the bearing surface, and the other arm inside one of the through holes of the other longitudinal bar, placing again this other arm at a predefined distance from the bearing surface.

However, the bearing elements for stringed musical instruments of known type have some inconveniences.

A first inconvenience is related to the fact that it is not possible to place stringed musical instruments of any kind, independently from the width or thickness of their body, on these bearing elements.

In fact, the support means of the bearing element have a specific conformation for some kinds of stringed musical instruments, for instance the electric guitars, which is different from that provided for other kinds of stringed musical instruments, like acoustic guitars or violins.

This happens because the widths of the bodies are different for any musical instruments.

Therefore, the prior art does not allow to place an acoustic guitar on a bearing element comprising support means especially provided for electric guitars.

On the contrary, it is possible to place an electric guitar on a bearing element having support means provided for placing an acoustic guitar, but in this way the electric guitar support is rather unstable and unsure.

On the other hand, bearing elements with the purpose of overcoming this inconvenience are available on the market, by using profiled arms which form more than one housing to allow the support of any kind of stringed musical instrument, either acoustic or electric guitars, or violins, or similar, on the bearing element.

However, even this solution, although representing a good evolution with respect to the prior art, does not allow a continuous regulation of the support means depending on the width or thickness of the guitar to be supported body.

In fact, the support means, made of the same material of the frame, that is metal, are fixed to said frame, so their position is not modifiable depending on the kind of body of the musical instrument to be supported by the support element.

As a consequence, it often happens that some stringed musical instruments placed on the support element are not perfectly fastened to it, making possible that a simple hit against said element or against the bearing surface which supports said element causes the fall of the instrument.

Another inconvenience of the prior art is the fact that the arms adjustment at a desired height on the longitudinal bars by the aforesaid fixing means needs the execution of rather complicated manual operations.

This is mainly due to the fact that the support elements provided with regulation means of known type are made of metallic material, with their components mutually linked by generally screwed coupling means.

The object of the present invention is to overcome the aforesaid inconveniences.

SUMMARY OF THE INVENTION

In particular, it is the main object of the present invention to provide for a universal bearing element able to support in a safer way with respect to the prior art any kind of stringed musical instrument, independently from the shape and the width of its body.

It is thus an object of the invention to provide for a universal bearing element which allows a continuous regulation of the support means depending on the body variable width of the stringed musical instruments, like acoustic and electric guitars, violins and so on, to be supported.

It is a further object of the invention that the aforesaid regulation is easier and faster with respect to equivalent devices of known type.

The above mentioned objects are attained by a bearing element for stringed musical instruments which, according to the contents of the main claim, comprises a mainly vertically arranged frame, able to be placed on a bearing surface, having support means which define a housing for receiving the body of said instrument, wherein each of said support means comprises a couple of mutually opposed jaws, joined together by regulation means able to modify in a continuous way the distance between said jaws.

Advantageously, the invention allows to a user, for instance a musician, to adapt in a practical and easy way the support of his stringed musical instrument to the shape of the body placed on the bearing element.

More advantageously, any stringed musical instrument is placed in a safe and stable way on the bearing element of the invention, because the regulation means available on the support means are continuously adapted to the shape and the thickness of the instrument body.

This is a considerable improvement with respect to the most recent equivalent devices of known type to which the invention is comparable.

Still advantageously, the support element of the invention is easy to manufacture and comprises easily available on the market components.

Moreover, the support element of the invention advantageously has rather convenient production costs, being almost entirely made of plastic components.

Furthermore, this aspect contributes to confer optimal lightness features to the bearing element of the invention, mainly distinguishing it from similar bearing element of prior art.

BRIEF DESCRIPTION OF THE DRAWINGS

Said objects and advantages, and others better specified in the following description, will be better highlighted in the description of preferred embodiments of the invention given in an explanatory way, with reference to the figures of the annexed drawings, wherein:

FIG. 2 is an axonometric exploded view of the bearing element of FIG. 1;

FIG. 2a is a cross section of a detail of FIG. 2;

FIG. 5 is an enlarged exploded frontal view of a further detail of FIG. 2;

FIG. 6 is a plan view of the detail of FIG., 5;

FIG. 7 is an exploded lateral view of the detail of FIG. 5;

FIG. 11 is an axonometric view of the bearing element of FIG. 1 in a fourth configuration, supporting an electric guitar having a body of irregular shape; and FIG. 12 is an axonometric view of the bearing element of FIG. 1 in a fifth configuration, supporting an electric guitar having a body of regular shape.

DESCRIPTION OF THE INVENTION

Figure 1:
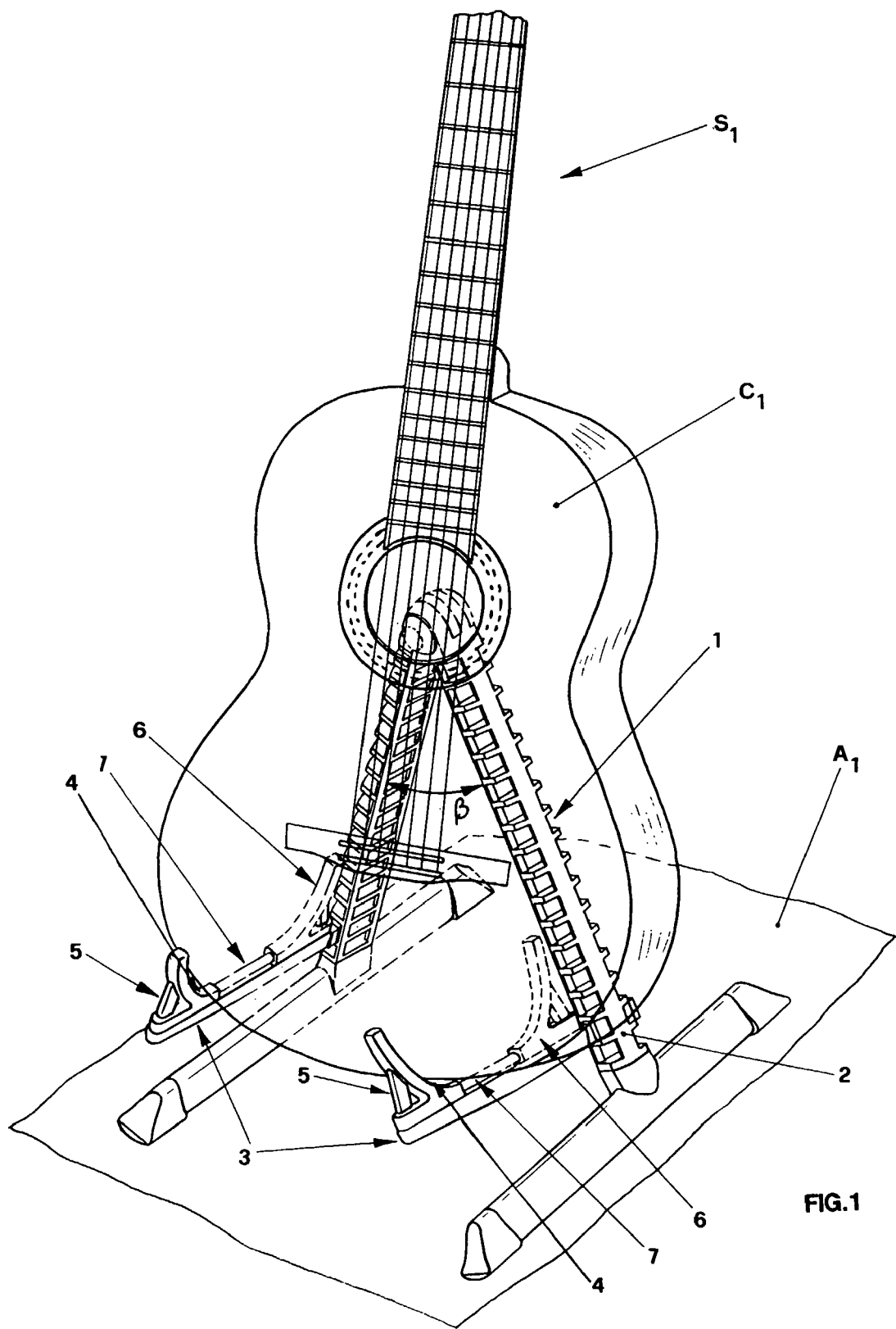
FIG. 1 is an axonometric view of the bearing element of the invention supporting an acoustic guitar.

The bearing element which is object of the present invention is shown in FIG. 1, where it is generally indicated with numeral 1, supporting a stringed musical instrument, generally indicated with $S_1$ and specifically representing a classic or, more properly, acoustic guitar.

The bearing element 1 comprises a mainly vertically arranged frame 2, to be placed on the bearing surface $A_1$, provided with support means generally indicated with numeral 3 which define a housing 4 suitable for receiving the body $C_1$ of the instrument $S_1$.

According to the invention, each of the support means 3 comprises a couple of mutually opposed jaws 5, 6, joined together by regulation means, generally indicated with numeral 7, able to modify in a continuous way the distance between the jaws 5, 6.

The frame 2 and the support means 3 are preferably made of plastic material, which allows to obtain particular constructive tricks in the components, providing for economic advantages for the manufacturer and handiness for the user of the bearing element 1, as it will be better explained as follows.

With reference to FIG. 2, it is pointed out that each of the support means 3 comprises an arm 8, 9 protruding from the frame 2 to which is coupled.

Each of the jaws 5, 6 is slidingly coupled to the respective arm 8, 9 and it comprises a shaped body which defines a concave surface 5a, 6a, preferably made of rubber and bounding on one side the aforesaid housing 4.

It is pointed out that, from this point on and until where otherwise specified, the description of the invention will be related to the arm 8 of the support means 3 only, being intended that the treated arguments are totally valid and applicable to the arm 9 too.

About the regulation means 7, always in FIG. 2 but more specifically in the enlargement of FIG. 2a it is noted that they comprise a linear guide 11, obtained on the upper surface 8a of the arm 8, and a linear counter-guide 12 inserted in the linear guide 11, obtained on the lower surface 6b of the jaw 6.

It is evident that what previously explained about the jaw 6 is valid for the jaw 5 also inserted in the linear guide 11 as well.

Preferably, but not necessarily, the linear guide 11 has a substantially C-shaped transversal sectional profile, while the linear counter-guide 12 has a substantially T-shaped transversal sectional profile which is adapted to the profile of the linear guide 11.

The regulation means 7 further comprise a pin 13, applied on the jaw 5, which is slidingly inserted in a blind hole 14 obtained in the jaw 6 opposed to the first jaw 5.

According to a preferred embodiment hereby described, the arm 8 comprises a longitudinal element applied on the frame 2 by first joint means, generally indicated with numeral 10 and provided with a clasp 15 snap-coupled with the frame 2.

More specifically, the arm 8 is provided at one end 8b with a pin 16 inserted in a through hole 17 obtained in the clasp 15.

A first couple of mutually opposed tangs 18, 19 snap-disposed against a stubbed portion, not shown in the annexed drawings, made in the internal wall of the through hole 17, is protruding from the pin 16, to avoid the accidental separation of the arm 8 from the clasp 15.

To better understand how the link between the arm 8 and the frame 2 is obtained, one can see that said frame 2 comprises two longitudinal bars 20, 21 mutually connected by joint means generally indicated with numeral 22.

Each of the longitudinal bars 20, 21 is provided with a plurality of through holes, generally indicated with numeral 23, which are disposed on the entire length of each of said longitudinal bars 20, 21 and each of them able to receive the snap-inserted clasp 15.

This clasp 15 is externally provided with a couple of fins 46, 47 snap-coupled with the external wall 20c, 21c of the respective longitudinal bar 20, 21.

In this way the clasp 15 can be detached, maybe even accidentally, from the longitudinal bar 20 only if the arm 8 has been already released by the same clasp 15.

It follows an advantage concerning the safe coupling between the support means 3 and frame 2 of the bearing element 1, essentially due to the fact that the components involved in the coupling are made of plastic material.

The use of the aforesaid plastic material allows in fact to manufacture flexible pieces which provide for the rapid insertion between the elements to be mutually coupled.

Furthermore, the user has to take off the musical instrument $S_1$ from the bearing element 1 before proceeding to release the arm 8 from the longitudinal bar 20, thus avoiding the execution of dangerous adjustment operations while the musical instrument $S_1$ is still placed on the bearing element 1.

Moreover, the through holes 23 allow the arrangement of the arm 8 and its relative clasp 15 at different heights from the bearing surface $A_1$, to give the more adapted support for the musical instrument $S_1$ by the bearing element 1.

This is performed with respect to the instrument body shape, as better explained hereinafter.

According to further embodiments of the invention, the above described through holes could be obtained just on a portion of the entire length of each longitudinal bar, in order to grant anyway a sufficient adjustability in height of the support means.

The FIG. 2 furthermore shows that each of the longitudinal bar 20, 21 leans on a corresponding substantially horizontally arranged base 39, 40 which is put in contact with the bearing surface $A_1$, to which is connected by second joint means generally indicated with numeral 41.

In detail, the second joint means 41 comprise a second couple of mutually opposed tangs 42, 43 placed at the first end 20a, 21a of each longitudinal bar 20, 21, which are snap-coupled in a wall obtained in a cavity 44, 45 made in the substantially intermediate portion 39a, 40a of the base 39, 40.

Figure 3:
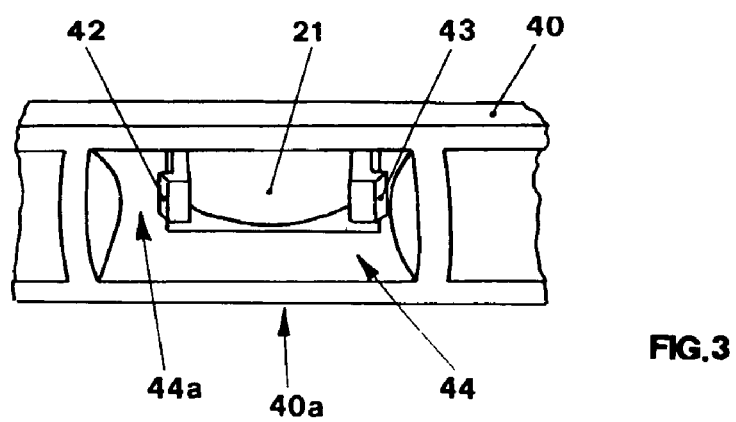
FIG. 3 is an enlarged bottom view of another detail of FIG. 2.

Said snap-coupling is better shown in FIG. 3 for the longitudinal bar 21 only, where it can be seen that the second tangs 42, 43 are snap-placed in a removable but stable manner against the wall 44a obtained in the cavity 44.

Figure 4:
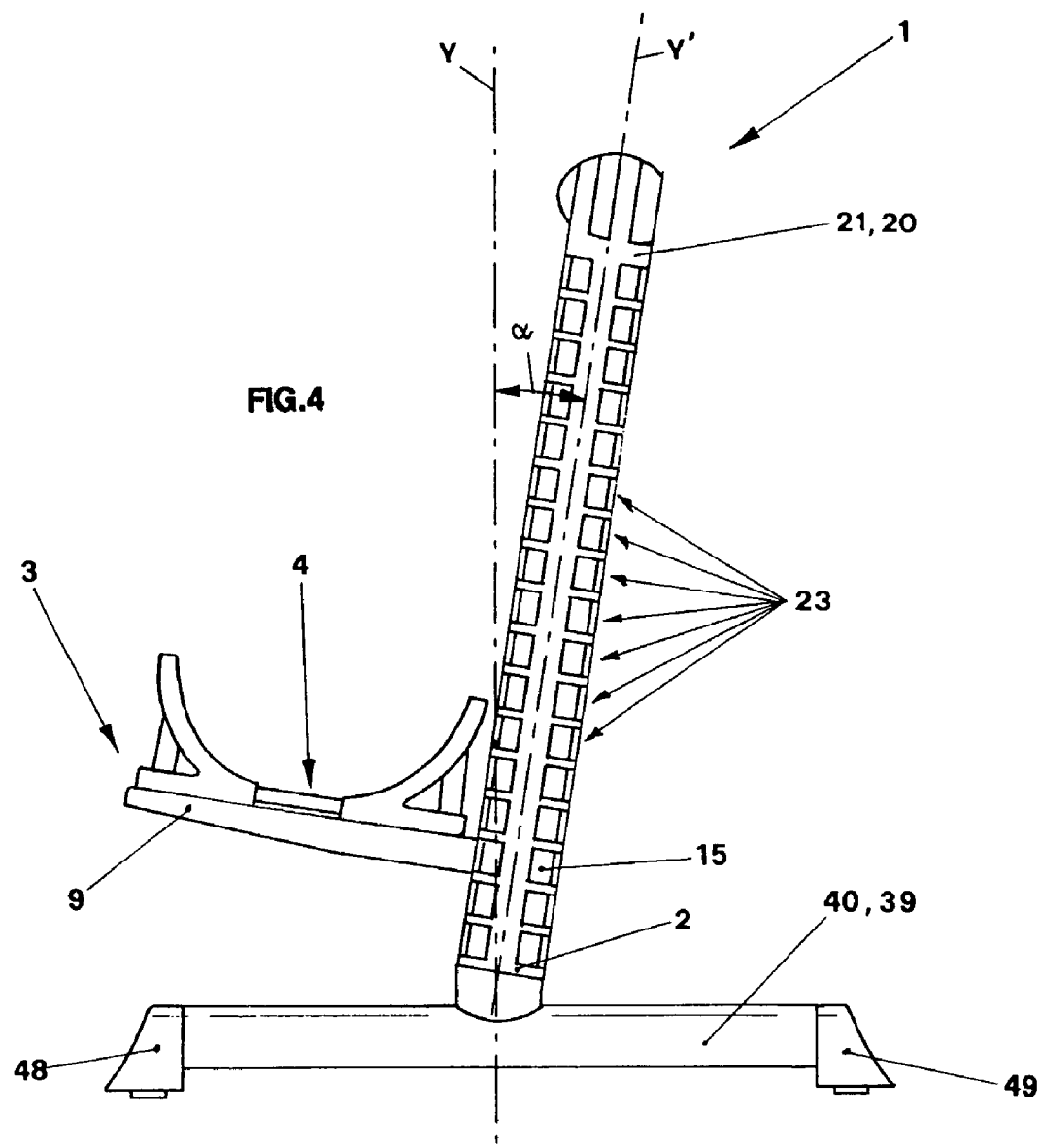
FIG. 4 is a lateral view of the bearing element of FIG. 1.

The following FIG. 4 shows that each of the longitudinal bars 20, 21 is arranged according to a longitudinal axis Y', which defines an acute angle α with a vertical reference axis Y, to enable the inclined support of the instrument $S_1$, not shown in this figure, on the frame 2.

Both in FIG. 2 and in FIG. 4 it is furthermore highlighted that the base 40 is provided with profiled feet 48, 49 arranged at the opposite ends 40b, 40c of the base 40 and made of rubber, used to grant a correct and stable support of the frame 2 on the bearing surface $A_1$.

It should be clear that said constructive detail is also present on the other base 39 of the bearing element 1.

Concerning the joint means 22 between the longitudinal bars 20, 21, in FIG. 2 it is shown that they comprise a couple of mutually complementary profiled appendixes 24, 25, each of them provided on a second end 20b, 21b of the comb-shaped longitudinal bars 20, 21 respectively, to mutually interpenetrate.

As evidenced in FIGS. from 5 to 7, particularly in FIG. 6, each of the profiled appendixes 24, 25 has a corresponding pin 26, 27.

The pin 26 is placed between two contiguous elements, indicated with numerals 30 and 31, of the comb of the profiled appendix 24, while the pin 27 is placed between two contiguous elements, indicated with numerals 32 and 33, of the comb of the profiled appendix 25.

In the step in which the longitudinal bars 20, 21 are mutually connected, the pin 26 is slidingly coupled with a groove 28 made on the lateral surface of the element 33 of the comb belonging to the profiled appendix 25, while the pin 27 is slidingly coupled with a groove 29 made on the lateral surface of the element 30 belonging to the profiled appendix 24.

The groove 29 comprises a substantially linear portion 29a extending from the lateral edge 24a to the central portion 24b of the profiled appendix 24, in which the pin 27 of the profiled appendix 25 slides.

The groove 29 furthermore comprises an enlarged section 29b of substantially circular shape, obtained in the central portion 24b of the profiled appendix 24, inside which the pin 27 rotates to allow the mutual opening of the longitudinal bars 20, 21 according to an angle substantially comprised from 0° and 90°.

It should be understood that what previously explained about the groove 29 made in the profiled appendix 24 is valid also for the groove 28 made in the profiled appendix 25.

Both grooves 28, 29 are made on the lateral surface of the corresponding comb element 33, 30 turned towards the pins 27, 26, respectively.

The enlarged section 29b of the groove 29 is provided with a step 34 obtained along a peripheral portion 129b of the enlarged section 29b.

The step 34 describes an arc of a circumference substantially variable from 0° and 90° and comprised between two counterpart walls, respectively indicated with numerals 35 and 36.

Moreover, the step 34 is provided with a plurality of ribs generally indicated with numeral 37, to which a stop element 38, placed adjacent to the pin 27 belonging to the opposite profiled appendix 25 is coupled, in order to block in different positions the opening between the longitudinal bars 20, 21 depending on the body dimensions of the stringed musical instrument to be placed on the bearing element 1.

When it is put in contact with the tappet walls 35, 36, the stop element 38 is furthermore used to block the mutual movement of the longitudinal bars 20, 21 in their closed (β~0°) and fully opened (β~90°) positions.

The shape of the joint means 22 prevents the forced or accidental separation of the longitudinal bars 20, 21 when even a slight opening angle β is formed between them.

Figure 8:
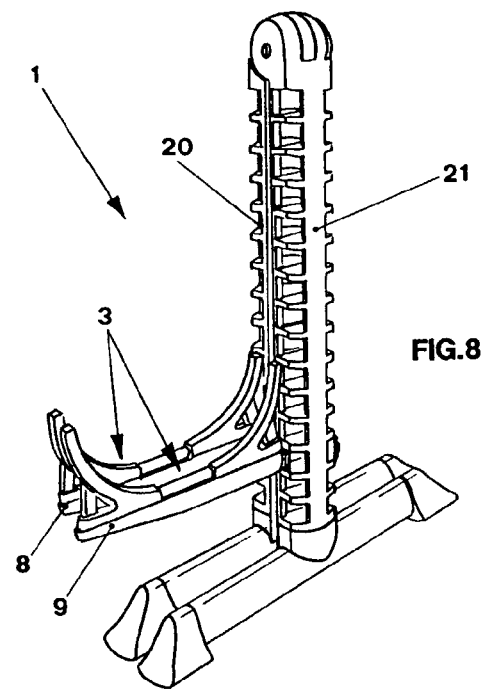
FIG. 8 is an axonometric view of the bearing element of FIG. 1 in a first configuration.

In fact, when the longitudinal bars 20, 21 are in the configuration of FIG. 8, the user could advantageously separate them, for instance to store or easily transport the bearing element 1.

Figure 9:
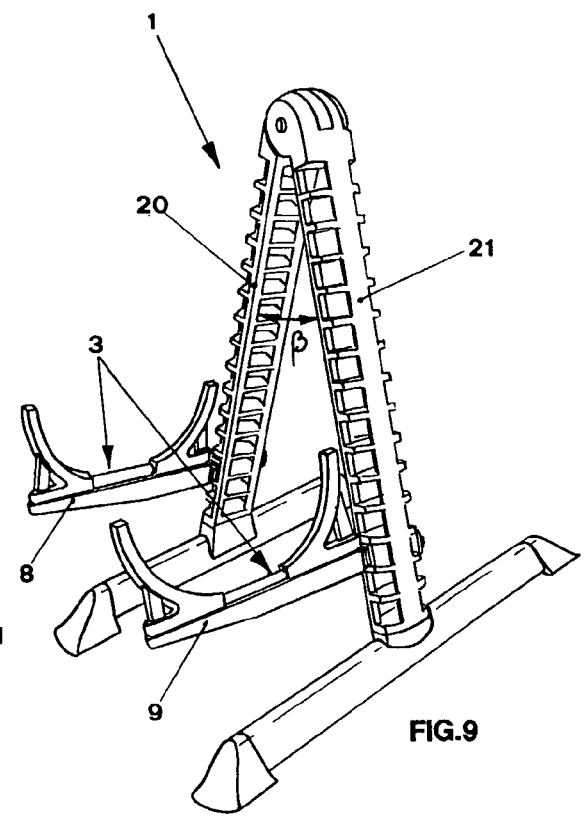
FIG. 9 is an axonometric view of the bearing element of FIG. 1 in a second configuration.
Figure 10:
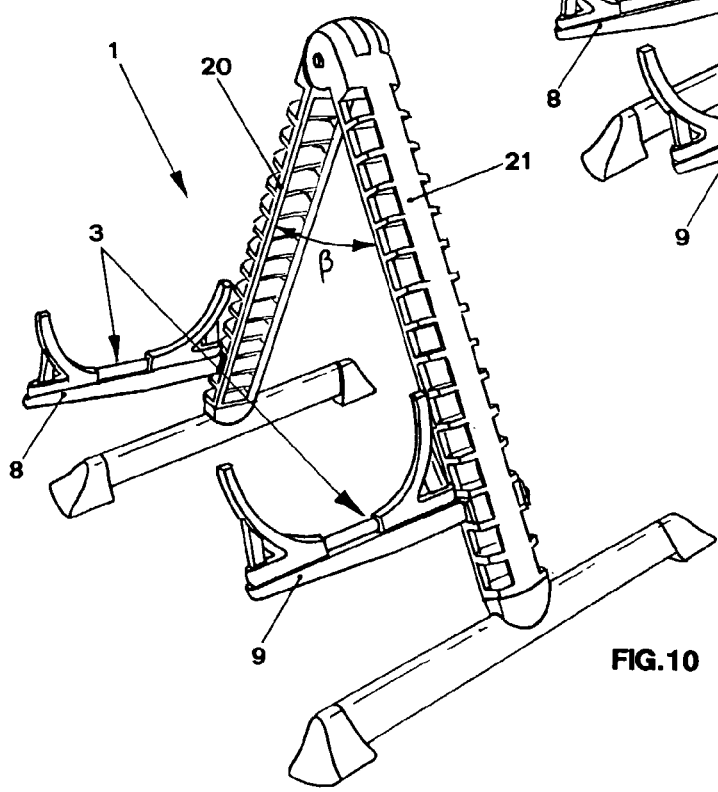
FIG. 10 is an axonometric view of the bearing element of FIG. 1 in a third configuration.

On the contrary, even if the user places the longitudinal bars 20, 21 partially and mutually opened, obtaining an acute opening angle β like in the configuration of FIG. 9, or fully opened, describing a substantially right opening angle β, as shown for instance in FIG. 10, he can not separate them except for applying a force that in any case irreparably compromises the functionality of the bearing element 1.

This aspect is another distinctive element of the invention, which concurs to make stable and safe the support of a stringed musical instrument on the bearing element, providing for a not negligible advantage taking into account the economic value of the musical instruments.

Operatively, as shown in FIGS. 9 or 10, the user places the bearing element 1 on the bearing surface $A_1$, with the longitudinal bars 20, 21 opened according to his needs, therefore as a function of the shape of the instrument $S_1$, like an acoustic guitar, body $C_1$.

Then he connects the arm 8, 9 to the respective longitudinal bars 20, 21 at the same height of the bearing surface $A_1$, first inserting the clasp 15 inside one of the through holes 23 and then the pin 16 inside said clasp 15.

Finally, the user acts on the regulation means 7, placing the jaws 5, 6 of each arm 8, 9 to a mutual distance and finding on them the housing 4 ready to receive the body $C_1$.

At this point, he puts the instrument Si on the bearing element 1, placing the body $C_1$ on the support means 3 and against the frame 2, at the joint means 22, in a precise and safe way.

In FIG. 11 the bearing element of the invention is shown, generally indicated with numeral 100 and placed on a bearing surface $A_2$, supporting a stringed musical instrument, generally indicated with $S_2$ and represented by an electric guitar provided with a body $C_2$ of regular shape and limited thickness, shaped according to the particular and actual tendencies of the "heavy metal bands".

In this situation, the user moves the jaws 103, 104 of each arm 106, 107 close to each other because the electric guitar $S_2$ has a body $C_2$ of lesser thickness than the one of the acoustic guitar $S_1$.

He then places each of the jaws 103, 104 close to the body $C_2$ of the musical instrument $S_2$ making turning the pin, not visible, of each arm 106, 107 around its own rotation axis Z and inside the through hole, neither visible, of the clasp 108.

This allows the user to place the support means, generally indicated with 102, mainly close to the body $C_2$ of the musical instrument $S_2$, securing it in a more stable way to the frame 101.

From this point of view, the invention provides for a considerable advantage with respect to the equivalent bearing elements of known type, which do not allow to place support means close to different stringed musical instruments in the way shown in FIG. 11.

FIG. 12 then shows the bearing element of the invention, generally indicated with numeral 200, supporting a stringed musical instrument generally indicated with $S_3$ and represented by an electric guitar provided in this specific case with a body $C_3$ of irregular shape.

In the present example, the user puts one of the arms 203, 204 forming the support means, generally indicated with numeral 202, at a different height from the bearing surface $A_3$ with respect to the other arm, so that the guitar $S_3$ is stably supported on said support means, generally indicated with numeral 202, although having a body $C_3$ of irregular shape.

He inserts the arm 204 inside one of the through holes 205, provided along the whole longitudinal bar 207, which is at a different height from the bearing surface $A_3$ with respect to another through hole 205 obtained on the other longitudinal bar 206 in which the arm 203 is inserted, to adapt the support means 202 to the asymmetric shape of the bottom $F_3$ of the guitar $S_3$ body $C_3$.

According to the invention, the arms of the support means are easily released from the longitudinal bars and placed inside the proper through hole, to obtain the stable leaning on the support element of the musical instrument according to the conformation of its body.

The bearing element of the invention is thus a universal means able to support any kind of stringed musical instrument, either an electric or acoustic guitar, a violin or similar.

The adjustment of the support means is almost complete, being adapted to any thickness and shape of the body of stringed musical instruments nowadays available on the market.

The support means are adjustable in height, length and around a rotation axis, and they can change their disposition according to the thickness and shape of the body of the stringed musical instrument to be supported.

The bearing element maintains anyway the opening adjustment of the longitudinal bars which form it, according to the dimensions of the stringed musical instrument.

The constructive simplicity of the bearing element components according to the invention provides for a regulation system of the musical instrument bearing means which is easier and faster with respect to the prior art.

On the basis of this disclosure, it is thus evident that the bearing element of the invention achieves all the objectives and realizes all the previously mentioned advantages.

In the executive step, modifications to the bearing element of the invention can be provided, consisting for instance in a different shape of the frame supporting the stringed musical instrument.

Besides that, in other embodiments the support and regulation means can have different shapes with respect to the previously described ones, without impairing the advantages provided by the present invention.

Moreover, in further embodiments the material of the bearing element could be of different kind from the indicated one, for instance aluminium.

All the described and cited, but not shown in the annexed drawings, embodiments should be intended as protected by the present patent if they fall in scope of protection of the following claims.

The invention claimed is:

1. A bearing element for stringed musical instruments comprising a mainly vertically arranged frame suitable for being placed on a bearing surface and provided with support means defining contact areas able to receive the body of said instrument, wherein each of said support means comprises a couple of mutually opposed jaws slidingly coupled to said support means and joined together through regulation means able to modify in a continuous way the distance between said jaws, each of said jaws comprising a shaped body which defines a concave surface bounding on one side of said contact areas;
   wherein each of said support means further comprises an arm protruding from said frame to which it is coupled; and
   wherein said regulation means comprise a linear guide obtained on the upper surface of said arm, and a linear counter-guide obtained on the lower surface of each of said jaws and inserted in said linear guide.

2. The bearing element according to claim 1, wherein said arm is a longitudinal element joined to said frame by first joint means.

3. The bearing element according to claim 1, wherein said regulation means further comprise a pin, applied on a first of said jaws, which is slidingly inserted in a blind hole obtained in a second of said jaws opposed to said first jaw.

4. The bearing element according to claim 1, wherein said linear guide has a substantially C-shaped transversal sectional profile.

5. The bearing element according to claim 1, wherein said linear counter-guide has a substantially T-shaped transversal sectional profile.

6. The bearing element according to claim 2, wherein said first joint means comprise a clasp snap-coupled with said frame.

7. The bearing element according to claim 6, wherein said arm is provided at one end with a pin inserted in a through hole obtained in said clasp.

8. The bearing element according to claim 7, wherein each of said jaws is arranged against said body of said instrument by rotating around the rotation axis determined by said pin to stably ensure said musical instrument to said frame.

9. The bearing element according to claim 6, wherein said frame consists of two longitudinal bars mutually connected by joint means.

10. The bearing element according to claim 9, wherein each of said longitudinal bars is provided with a plurality of through holes which are arranged on at least a length portion of each of said longitudinal bars, each of them being able to receive the snap-inserted clasp.

11. The bearing element according to claim 9, wherein each of said longitudinal bars leans on a substantially horizontally arranged base suitable for being put in contact with said bearing surface, to which is connected by second joint means.

12. The bearing element according to claim 11, wherein each of said longitudinal bars is arranged according to a longitudinal axis which defines an acute angle with a vertical reference axis, for the inclined support of said instrument on said frame.

13. The bearing element according to claim 11, wherein said base is provided with profiled feet arranged at the opposite ends of said base for granting a correct and stable support of said frame on said bearing surface.

14. The bearing element according to claim 1, wherein said frame and said support means are made of plastic material.

15. A bearing element for stringed musical instruments comprising a mainly vertically arranged frame suitable for being placed on a bearing surface and provided with support means defining contact areas able to receive the body of said instrument, wherein each of said support means comprises a couple of mutually opposed jaws slidingly coupled to said support means and joined together through regulation means able to modify in a continuous way the distance between said jaws, each of said jaws comprising a shaped body which defines a concave surface bounding on one side of said contact areas;

wherein each of said support means further comprises an arm protruding from said frame to which it is coupled;

wherein said arm is a longitudinal element joined to said frame by first joint means;

wherein said first joint means comprise a clasp snap-coupled with said frame;

wherein said arm is provided at one end with a pin inserted in a through hole obtained in said clasp; and wherein from said pin is protruding a first couple of mutually opposed tangs, snap-disposed against a stubbed portion made in the internal wall of said through hole, to avoid the accidental separation of said arm from said clasp.

16. The bearing element according to claim 15, wherein said frame and said support means are made of plastic material.

17. A bearing element for stringed musical instruments comprising a mainly vertically arranged frame suitable for being placed on a bearing surface and provided with support means defining contact areas able to receive the body of said instrument, wherein each of said support means comprises a couple of mutually opposed jaws slidingly coupled to said support means and joined together through regulation means able to modify in a continuous way the distance between said jaws, each of said jaws comprising a shaped body which defines a concave surface bounding on one side of said contact areas;

wherein each of said support means further comprises an arm protruding from said frame to which it is coupled;

wherein said arm is a longitudinal element joined to said frame by first joint means;

wherein said first joint means comprise a clasp snap-coupled with said frame;

wherein said frame consists of two longitudinal bars mutually connected by joint means; and wherein said joint means comprise a couple of mutually complementary profiled appendixes, each of them provided on a second end of the longitudinal bars respectively, to mutually interpenetrate.

18. The bearing element according to claim 17, wherein each of said profiled appendixes comprises a pin placed between two contiguous elements of said comb, which is slidingly coupled with a groove made on the lateral surface of an element of said comb belonging to the other of said profiled appendixes.

19. The bearing element according to claim 18, wherein said groove comprises:

a substantially linear portion extending from the lateral edge to the central portion of each of said profiled appendixes, in which said pin for coupling said longitudinal bars slides;

an enlarged section of substantially circular shape, made in said central portion of each of said profiled appendixes, inside which said pin rotates to allow the mutual opening of said longitudinal bars according to an angle substantially comprised from 0° and 90°.

20. The bearing element according to claim 19, wherein said enlarged section is provided with a step made along a peripheral portion of said enlarged section.

21. The bearing element according to claim 20, wherein said step describes an arc of a circumference substantially variable from 0° and 90° and comprised between two counterpart walls.

22. The bearing element according to claim 20, wherein said step is provided with a plurality of ribs to which is coupled a stop element, placed adjacent to said pin belonging to the opposite profiled appendix, in order to block in different positions the opening between said longitudinal bars.

23. The bearing element according to claim 17, wherein said frame and said support means are made of plastic material.

24. A bearing element for stringed musical instruments comprising a mainly vertically arranged frame suitable for being placed on a bearing surface and provided with support means defining contact areas able to receive the body of said instrument, wherein each of said support means comprises a couple of mutually opposed jaws slidingly coupled to said support means and joined together through regulation means able to modify in a continuous way the distance between said jaws, each of said jaws comprising a shaped body which defines a concave surface bounding on one side of said contact areas;

wherein each of said support means further comprises an arm protruding from said frame to which it is coupled;

wherein said arm is a longitudinal element joined to said frame by first joint means;

wherein said first joint means comprise a clasp snap-coupled with said frame;

wherein said frame consists of two longitudinal bars mutually connected by joint means;

wherein each of said longitudinal bars leans on a substantially horizontally arranged base suitable for being put in contact with said bearing surface, to which is connected by second joint means; and wherein said second joint means comprise a second couple of mutually opposed tangs placed at the first end of each of said longitudinal bars, which are snap-coupled in a wall made in a cavity present in the intermediate portion of said base.

* * * * *

UNITED STATES PATENT AND TRADEMARK OFFICE
CERTIFICATE OF CORRECTION

PATENT NO. : 7,394,006 B2  
APPLICATION NO. : 10/589139  
DATED : July 1, 2008  
INVENTOR(S) : Riccardo Bordignon Page 1 of 1

It is certified that error appears in the above-identified patent and that said Letters Patent is hereby corrected as shown below:

On the Title Page, Item (73)

The assignee information is corrected to read as follows:

(73) Assignee: Tecnoplast S.r.l., Romano d'Ezzelino (IT)

Signed and Sealed this

Second Day of June, 2009

JOHN DOLL  
*Acting Director of the United States Patent and Trademark Office*